Figure 1:
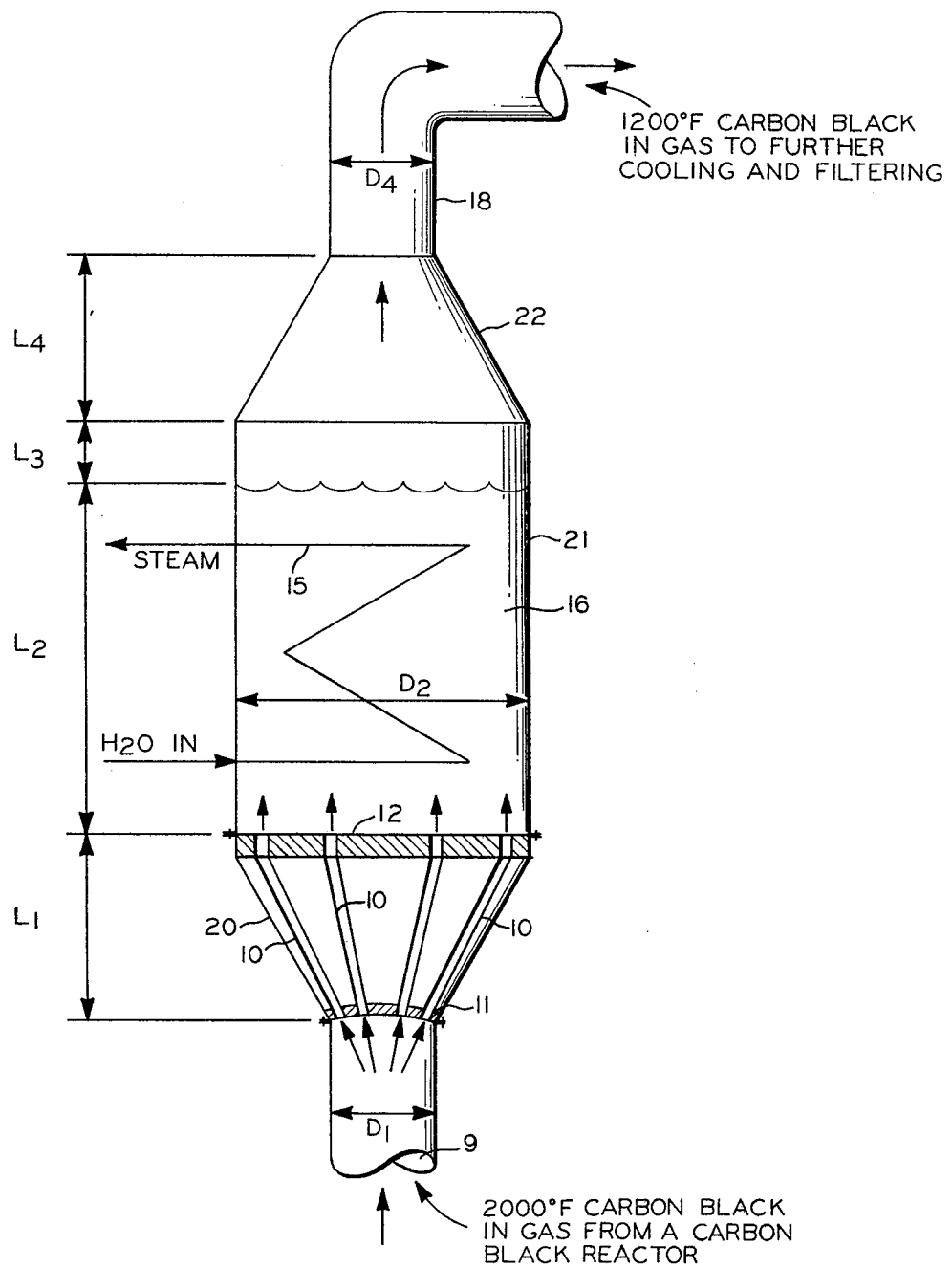

United States Patent [19]

Cheng

[11] 4,245,693
[45] Jan. 20, 1981

[54] WASTE HEAT RECOVERY

[75] Inventor: Paul J. Cheng, Bartlesville, Okla.

[73] Assignee: Phillips Petroleum Company, Bartlesville, Okla.

[21] Appl. No.: 950,349

[22] Filed: Oct. 11, 1978

[51] Int. Cl.³ .................... F28D 13/00; F26B 17/00
[52] U.S. Cl. ...................................... 165/1; 122/4 D; 165/104 F
[58] Field of Search ............... 165/104 F, 1; 122/4 D; 34/57 A

[56] References Cited

U.S. PATENT DOCUMENTS

| | | | |
|---|---|---|---|
| 3,075,580 | 1/1963 | Davis, Jr. .................... | 165/104 F |
| 3,890,935 | 6/1975 | Moss et al. .................... | 122/4 D |
| 4,010,002 | 3/1977 | Degel et al. .................... | 34/57 A |
| 4,097,243 | 6/1978 | Bartholic .................... | 34/57 A |
| 4,149,586 | 4/1979 | Phillips et al. .................... | 165/104 F |

Primary Examiner—Stephen Marcus
Assistant Examiner—Janice A. Howell

[57] ABSTRACT

A fixed fluidized particulate solids bed heat recovery vessle or steam generator having indirect heat exchange means within the bed and introduction of a gas containing an entrained solids by way of a spread tube bundle which connects the small diameter gas inlet conduit to the larger diameter bottom section of the fluidized bed to effect even distribution of the gas and entrained solids into the bed and to effect fluidization of the bed. In a preferred embodiment, the total cross-sectional area of the tubes in the tube bundle is at least 90 percent of the cross-sectional area of the inlet conduit so that the gas velocity is sufficient to maintain the solids entrained in the gas, and the upper section of the unit above the fluidized bed converges so that gas velocity is sufficient to maintain solids entrained in the gas being removed from the unit.

9 Claims, 1 Drawing Figure

WASTE HEAT RECOVERY

This invention relates to method and apparatus for the transfer of heat from and to gases containing entrained solids. In accordance with another aspect, this invention relates to an improved apparatus comprising a waste heat recovery unit containing a fluidized bed of particulate solids wherein a gas containing suspended or entrained solids is introduced into the fluidized bed through a plurality of small diameter conduits to insure that the suspended solids remain entrained in the carrying gas until the mass enters the enlarged cross-sectional fluidized bed. In accordance with another aspect, the tubes in the tube bundle carrying the gas containing entrained solids from the inlet conduit into the enlarged cross-sectional fluidized bed portion of the unit are evenly distributed at the outlet end to provide even flow across the fluidized bed. In accordance with a further aspect, the actual gas passage space in the enlarged zone occupied by the fluidized "fixed" bed of particulate solids is substantially the same cross-sectional area as that of the inlet conduit or outlet conduit of the unit, thereby preventing the suspended solids from accumulating in the fluidized bed and allowing the suspended solids to flow in an entrained manner in these gases.

There are two problems in the design of a fluidized bed waste heat boiler for gas streams containing small particulate materials suspended therein such as carbon black smoke. One of the problems encountered is the difficulty in maintaining a high enough stream velocity up to the distribution plate below the fluidized bed so that the suspended solids will not settle out during the expanding approach to the fluidized bed. Another problem encountered is the tendency of the suspended particulate material, especially carbon black particles, to conglomerate somewhat while passing through the fluidized bed. In view of this tendency of the suspended solids, the low flow velocity prevailing inside the bed chamber is not adequate to transport the suspended solids out of the unit, resulting in accumulation of suspended solids in the fluidized bed which is undesirable. The present invention is directed to method and apparatus for eliminating these as well as other problems to provide a trouble-free waste heat boiler operation.

Accordingly, an object of this invention is to provide an improved waste heat recovery apparatus.

A further object is to provide a method for carrying out heat exchange in a fluidized bed operation with gases containing suspended solids.

In accordance with another object, improved means are provided for introducing a gas containing suspended solids into a fluidized bed waste heat recovery unit.

Other objects and aspects, as well as the several advantages of the invention, will be apparent to those skilled in the art upon reading the specification, the drawing, and the appended claims.

In accordance with the invention, a "fixed" fluidized bed heat exchanger having an indirect heat exchange means within the bed has a gas-containing entrained solids charged into the "fixed" fluidized bed by a spread tube bundle containing a plurality of small diameter tubes to effect even distribution of the gases into the fluidized bed and to effect fluidization of the fluidized bed and indirect heat exchange with a heat exchange medium being passed through the indirect heat exchange means.

In accordance with one specific embodiment, the tube bundle has a total flow path, i.e., the sum of the cross-sectional areas of all of the tubes, which is no greater than, and is about equal to or even somewhat less than, but not less than about 90 percent of the cross-sectional area of the inlet tube passing solids entrained in gas therethrough to insure that the solids remain entrained in the carrying gas until the mass enters the enlarged cross-sectional fluidized bed.

In accordance with another embodiment of the invention, the outlets of the tubes in the tube bundle are arranged evenly across the cross-section of the fluidized bed to effect an even distribution of gas flow into the enlarged fluidized solids zone of the waste heat recovery unit.

In accordance with a further embodiment of the invention, the actual gas passage space in the enlarged zone occupied by the fluidized "fixed" bed of particulate solids is substantially the same cross-sectional area as that of the outlet or inlet conduits, which prevents the suspended solids from accumulating in the fluidized bed and allows the suspended solids to flow in an entrained manner in these gases.

The velocity of the mass required to maintain entrainment depends upon many factors including the density and sizes of the particles entrained in the gas. Typically, for carbon black to be entrained in the carbon black reactor effluent smoke, the minimum range of linear velocity is about 50 to about 100 feet per second. Operating range preferred for carbon black (flocculent carbon black in the range of about 2 to about 30 micron size) is about 150 to 400 feet per second linear velocity.

In a preferred embodiment, the carbon black-containing smoke passes through a fluidized sand bed and out of the top section of the fluidized bed boiler where the cross-sectional area is decreased to insure entrainment of the now cooled carbon black in the flowing (now cooled) gas. The sand is heated by the hot smoke, and the sand transfers this heat to the water coil within the bed to produce steam. The depositing of any carbon black on the sand is removed by the fluidized "contact" of the sand particles with one another.

A better understanding of the invention will be obtained upon reference to the drawing which illustrates one preferred embodiment of an apparatus according to the invention.

Referring now to the drawing, a hot gas such as carbon black smoke at a temperature of about 2000° F. enters the system by way of conduit 9 located in a lower portion of the waste heat recovery unit. The waste heat recovery unit comprises, in addition to inlet conduit 9, a cone-shaped section 20, an enlarged fluidized bed section 21, an inverted cone section 22, and an outlet conduit 18. A tube sheet 11 is provided at the juncture of conduit 9 with a lower portion of cone-shaped section 20 and a tube sheet or distributor plate 12 is positioned at the upper end of the tube bundle at the juncture with the enlarged fluidized bed section 21 and section 20 of the unit. A plurality of small cross-sectional area tubes or a tube bundle is positioned within cone-shaped section 20 and connected to tube sheets 11 and 12. In a preferred embodiment, the outlets of the tubes in tube sheet 12 are evenly distributed so that gas exiting from the small cross-sectional areas of tube 10 will be evenly distributed across the lower portion of the fluidized bed of particulate material. The tubes can be arranged on an equilateral triangular pitch, square pitch, hexagonal pitch, or any other desired pitch to obtain even distribution of the inlet gas.

Enlarged section 21 is provided with a fluidized bed of particulate material such as sand 16. The depth of the sand covers substantially the entire length of the enlarged section 21. Positioned within the bed of particulate material 16 is a heat exchange coil 15 through which water or other heat exchange fluid can be passed and converted to steam or other vapor.

The upper section or tapered area 22 causes the gases leaving the fluidized bed to accelerate and at the same time keep the solids, such as carbon black, entrained in the gas leaving the heat exchanger at 18. The hot gas reduced in temperature to, say, about 1200° F. is removed by way of conduit 18 and passed to further processing such as additional cooling and then filtering, as desired, to recover the carbon black particles from the gas.

In the specific embodiment described, the total cross-sectional areas of all of the tubes 10 of the bundle positioned within cone-shaped section 20 is at least 90 percent of the cross-sectional area of inlet conduit 9 to insure that the solids entrained in the inlet gas remain entrained in the carrying gas until the mass enters the enlarged cross-sectional fluidized bed 16.

The actual gas passage space in the enlarged zone 21 occupied by the fluidized bed of sand 16 is substantially the same cross-sectional area as that of the inlet conduit 9 or outlet conduit 18, which prevents suspended or entrained solids, such as carbon black, from accumulating in bed 16, and allows the suspended solids, such as carbon black, to flow in an entrained manner in these gases.

SPECIFIC EXAMPLE

The following calculated example sets forth conditions and particular dimensions for an apparatus such as set forth in the drawing.

| TYPICAL OPERATION (Calculated) | |
|---|---|
| I. Apparatus: | |
| Inlet diameter, $D_1$, ft. | 1.5 |
| Flow area, ft.$^2$ | 1.77 |
| Fluid bed zone, $D_2$, ft. | 11 |
| Outlet diameter, $D_4$ | 1 ft., 8 in. |
| Flow area, ft.$^2$ | 2.18 |
| Tube bundle, $L_1$, ft. | 5 |
| Stationary fluid bed zone, $L_2$, ft. | 4 |
| Sand disengagement zone, $L_3$, ft. | 3 |
| Tapered outlet, $L_4$, ft. | 5 |
| (10) Conduits or Tubes: | |
| Number | 300 |
| Diameter of each, in. | 1 |
| Total area, ft.$^2$ | 1.65 |

These conduits 10 are evenly spaced in tube sheet 11 and in tube sheet 12.

Steam coil 15 is located within expanded fluidized-fixed sand bed 16 to remove heat from the sand which has been used to cool the carbon black smoke and its carrying gas (effluent from a carbon black furnace).

| II. Typical Operation (Calculated): | | |
|---|---|---|
| (16) | Sand used in fluidized bed: | |
| | Particle size, inches | 0.03 to 0.04 |
| | Pounds used | 38,000 |
| | Expanded bed depth, ft. | 6 |

| -continued | | |
|---|---|---|
| II. Typical Operation (Calculated): | | |
| (9) | Carbon black reactor effluent smoke: | |
| | SCF/hr. | 470,000 |
| | Lbs. carbon/1000 SCF | 6.5 |
| | Temperature, °F. | 2,000 |
| | Pressure, psig | 4.5 |
| | Velocity, ft/second | 270 |
| (10) | Actual velocity in each tube, ft./sec. | 290 |
| (18) | Cooled reactor effluent smoke: | |
| | SCF/hour | 470,000 |
| | Lbs carbon black/1000 SCF | 6.5 |
| | Temperature, °F. | 1,200 |
| | Pressure, psig | 1.5 |
| | Actual velocity, ft/sec | 175 |
| Average bed temperature, °F. | | 1,250 |
| Pounds of steam produced/hr. | | 12,600 |
| Temperature, °F. | | 489 |
| Pressure, psig | | 600 |

SCF = Standard cubic feet, 60° F., 1 atmosphere.

Although the invention has been illustrated above using a fixed fluidized bed of sand as the heat exchange solids, other solids such as alumina, silica-alumina, and the like, of course, can be used. Solids other than carbon black entrained in gas can be heat exchanged with the fluidized solids. For example, various pigments entrained in gas can be used. Also, instead of water being in the heat exchange coil, Dowtherm, or a hydrocarbon to be converted, e.g., cracked thermally, or preheated, can be used in the heat exchange coil.

Further, instead of cooling a material entrained in a gas, the system can be used to heat a material entrained in a gas, with a heating fluid passing through the coil located within the fluidized fixed bed of solids.

I claim:

1. A process for indirect heat exchange between a gas stream containing suspended light solids and a heat exchange fluid which comprises:
   (a) introducing a gas stream containing entrained solids into an inlet connected to a lower portion of an enlarged heat exhange zone containing a fluidized bed of particulate solids and a heat exchange coil extending into said fluidized bed and having a heat exchange fluid flowing through said coil,
   (b) passing said gas stream from said inlet as a plurality of small streams through a plurality of small flow passages at substantially the same flow velocity as in said inlet and introducing said small streams into a lower portion of said enlarged heat exchange zone,
   (c) flowing said gas stream through said fluidized bed or particulate solids at a flow rate sufficient to maintain fluidized conditions and at a rate such that said gas is heated or cooled by the heat exchange fluid in said coil, and
   (d) removing said gas stream containing suspended solids at a different temperature from an upper portion of said heat exchange zone.

2. A process according to claim 1 wherein the sum of the cross-sectional areas of said flow passages is at least 90 percent of the cross-sectional area of said inlet and said gas stream is at a higher temperature than said heat exchange fluid.

3. A process according to claim 1 wherein said gas stream contains suspended carbon black and the inlet temperature of said gas stream is about 2000° F. and the outlet temperature is about 1200° F.

4. A process according to claim 1 wherein said fluidized particulate solid is sand, said gas stream is at a substantially higher temperature than said heat exchange fluid, and said heat exchange fluid is water which is converted to steam.

5. A process according to claim 1 wherein the actual gas passage space in the enlarged heat exchange zone occupied by the fluidized bed of particulate solids is substantially the same cross-sectional area as that of the inlet or outlet conduits which prevents the entrained solids from accumulating on the fluidized bed and allows the suspended solids to flow in an entrained manner in the gas.

6. A process according to claim 1 wherein the outlet end of said small flow passages are distributed evenly across the lower portion of the fluidized bed of particulate solids so that an even distribution of flow is obtained in the enlarged fluidized section of said heat exchange zone.

7. A fluidized bed heat exchange vessel adapted to recover heat from or transfer heat to gas streams containing suspended light solids which comprises, in combination:
(a) an elongated, substantially vertical vessel having an inlet conduit connected to a lower portion and an outlet conduit connected to an upper portion of said vessel,
(b) a cone-shaped section connecting said inlet conduit and the lower portion of an enlarged fluidized bed section of said vessel,
(c) an inverted cone-shaped section connected to an upper portion of said enlarged section and said outlet conduit,
(d) a grid or distributor plate in the lower portion of said enlarged section adapted to support the fluidized bed of particulate solids above said grid and allow gas to pass through said enlarged section,
(e) a tubular heat exchange coil extending into the enlarged section of said vessel and said fluidized bed so that the heat exchange fluid passing through said coil can absorb heat from or transfer heat to a gas stream containing entrained solids passing through said fluidized particulate solids, and
(f) a plurality of small tubular conduits positioned within said cone-shaped section (b) and connecting said inlet and said enlarged section, the sum of all of the cross-sectional areas of said smaller tubular conduits being at least 90 percent of the cross-sectional area of said inlet conduit so that solids remain entrained in the carrying gas until the mass enters the enlarged section.

8. An apparatus according to claim 7 wherein the outlet ends of said smaller tubular conduits are distributed evenly across the face of said grid or distribution plates so that an even distribution of flow is obtained in the enlarged fluidized section.

9. An apparatus according to claim 7 wherein said enlarged section is cylindrical and the actual gas passage space in said enlarged section occupied by said fluidized particulate solids is substantially the same cross-sectional area as that of the inlet or outlet conduit, thus preventing entrained solids from accumulating in said fluidized bed.

* * * * *